J. TRIMBLE & M. C. BOOKHOUT.
Egg, Fruit, and Food Preservers.

No. 147,712.    Patented Feb. 17, 1874.

WITNESSES
E. H. Bates
George E. Upham.

INVENTORS.
James Trimble
Martin C. Bookhout
By Chipman Hosmer & Co.
ATTORNEYS.

AM. PHOTO-LITHOGRAPHIC CO. N.Y. (OSBORNE'S PROCESS.)

UNITED STATES PATENT OFFICE.

JAMES TRIMBLE AND MARTIN C. BOOKHOUT, OF XENIA, ILLINOIS.

IMPROVEMENT IN EGG, FRUIT, AND FOOD PRESERVERS.

Specification forming part of Letters Patent No. 147,712, dated February 17, 1874; application filed November 15, 1873.

*To all whom it may concern:*

Be it known that we, JAMES TRIMBLE and MARTIN C. BOOKHOUT, of Xenia, in the county of Clay and State of Illinois, have invented a new and valuable Improvement in Egg, Fruit, and Food Preservers; and we do hereby declare that the following is a full, clear, and exact description of the construction and operation of the same, reference being had to the annexed drawings making a part of this specification, and to the letters and figures of reference marked thereon.

Figure 1:
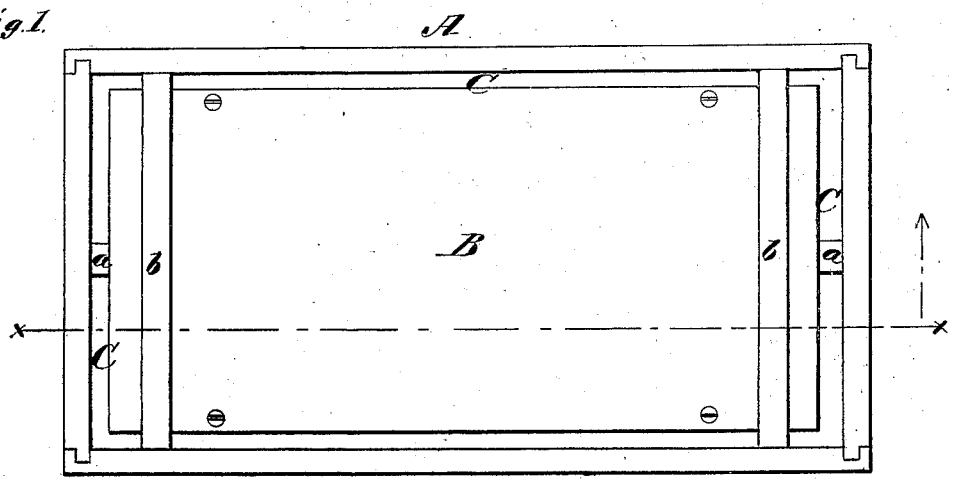
Figure 2:
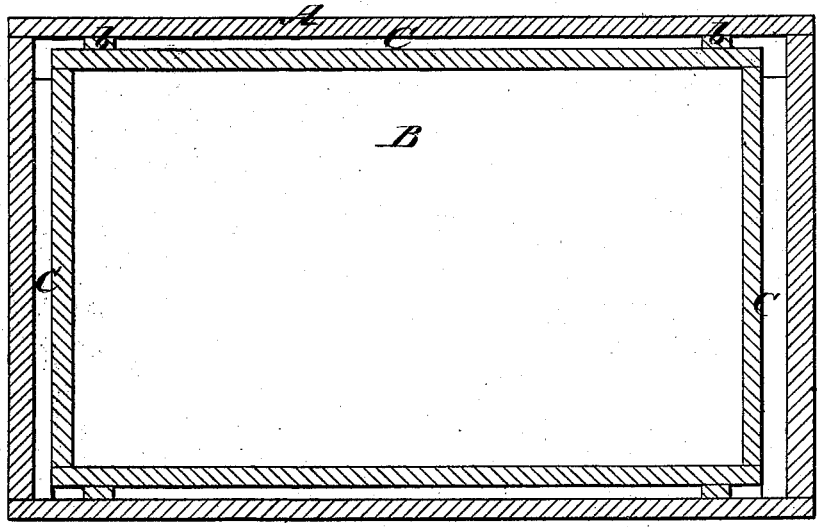
Figure 3:
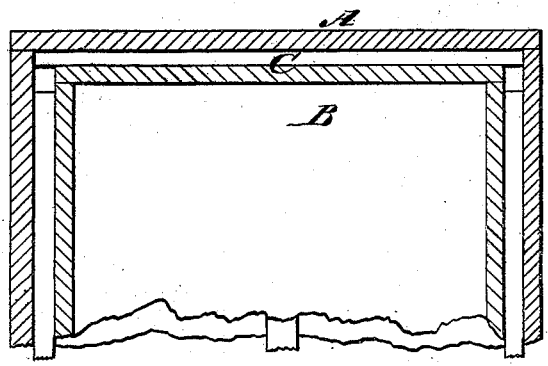

Figure 1 of the drawings is a representation of a side view of our device. Fig. 2 is a longitudinal section of the same. Fig. 3 is a detail section of the same.

This invention has relation to the preservation of eggs, fruit, and food of various kinds, wherein it is necessary to exclude air and moisture. The nature of our invention consists in the arrangement of spacing-strips surrounding the inner box, to keep it at a given distance from the outer box, the spaces being filled with melted tallow or other substance, which will exclude air and moisture, as will be hereinafter more fully described.

In the annexed drawings, A B represent two boxes, which are made of wood jointed together so as not to leak. The inside box, B, is smaller than the external box, and is isolated therein by means of cleats or narrow strips $a$ $b$, so that a space of one inch, more or less, entirely surrounds the inside box, as indicated by the letter C.

When the box B is filled with the articles to be preserved, and its cover is secured tightly upon it, it is adjusted into the box A and the space C completely filled with melted tallow, or some other substance possessing equivalent properties of a fluid when heated and a solid when cool. The top of the outside box is then secured upon it and the work is done.

It will be seen from the above description that the articles in box B are inclosed by three walls, the intermediate wall being the tallow referred to, which will effectually exclude air and moisture.

The spacing-strips $a$ $b$ constitute the essential features of my improvement, and serve to properly space the interior box in the outer box, so that the fluid filling material will flow uniformly and entirely around the inner box, after which, should such filling material become soft from any cause, the said strips will sustain the interior box in its proper position, and prevent it from settling to the bottom of the exterior box.

We do not claim a filling of tallow between two wooden boxes, as this is shown and claimed in the patent granted W. A. Keeler, July 31, 1860.

What we claim as new, and desire to secure by Letters Patent, is—

The spacing-strips $a$ $b$, in combination with the boxes A B and a tallow filling, as shown, and for the purpose specified.

In testimony that we claim the above we have hereunto subscribed our names in the presence of two witnesses.

JAMES TRIMBLE.
MARTIN C. BOOKHOUT.

Witnesses:
SILAS RENICK,
RICHARD S. MORRIS.